United States Patent
Koster et al.

(10) Patent No.: US 11,925,937 B2
(45) Date of Patent: Mar. 12, 2024

(54) SYSTEM FOR PRODUCING LIVESTOCK BEDDING

(71) Applicants: Jeff A. Koster, Carroll, IA (US); Matthew R. Ahrenholtz, Carroll, IA (US)

(72) Inventors: Jeff A. Koster, Carroll, IA (US); Matthew R. Ahrenholtz, Carroll, IA (US)

(73) Assignee: Koster Grain, Inc., Carroll, IA (US)

( * ) Notice: Subject to any disclaimer, the term of this patent is extended or adjusted under 35 U.S.C. 154(b) by 204 days.

(21) Appl. No.: 17/199,975

(22) Filed: Mar. 12, 2021

(65) Prior Publication Data
US 2021/0283619 A1    Sep. 16, 2021

Related U.S. Application Data

(60) Provisional application No. 62/988,779, filed on Mar. 12, 2020.

(51) Int. Cl.
*B02C 13/284* (2006.01)
*A01K 1/015* (2006.01)
*B02C 13/286* (2006.01)
*B02C 21/00* (2006.01)
*B02C 23/08* (2006.01)

(52) U.S. Cl.
CPC .......... *B02C 13/284* (2013.01); *A01K 1/0154* (2013.01); *A01K 1/0155* (2013.01); *B02C 13/286* (2013.01)

(58) Field of Classification Search
CPC ..... B02C 13/284; B02C 13/286; B02C 23/08; B02C 23/38; B02C 23/10; B02C 23/14; B02C 23/16; B27L 11/00; B27L 11/007; A01K 1/0154; A01K 1/0155; A01K 1/0152
See application file for complete search history.

(56) References Cited

U.S. PATENT DOCUMENTS

| | | | | |
|---|---|---|---|---|
| 4,378,756 A * | 4/1983 | Whiteman | ........... | A01K 1/0155 119/172 |
| 5,265,561 A * | 11/1993 | Crawford | ............. | A01K 1/0155 119/172 |
| 6,436,384 B2 * | 8/2002 | Santoiemmo | ........ | A01K 1/0155 424/76.8 |

* cited by examiner

*Primary Examiner* — Matthew Katcoff
*Assistant Examiner* — Mohammed S. Alawadi
(74) *Attorney, Agent, or Firm* — Brett J. Trout (57) ABSTRACT

The present disclosure is directed to a system and method for converting metal-containing waste wood material into livestock bedding having a reduced metal content. Waste wood, such as used or broken pallets is placed in a hammermill having a screen with holes of a larger diameter. The output of that hammermill is then placed in a hammermill having a screen with holes of a smaller diameter. A crossbelt system of magnets is passed across the waste wood to remove nails and other metal contaminates from the waste wood to produce a low metal content livestock bedding having particles of a consistent size.

18 Claims, 9 Drawing Sheets

SYSTEM FOR PRODUCING LIVESTOCK BEDDING

TECHNICAL FIELD

The disclosed embodiments relate generally to a system for producing livestock bedding and, in particular, to a system for producing a more consistent livestock bedding from wood waste with fewer metal contaminants.

BACKGROUND

The use of wood shavings and other various wood products as livestock bedding has long been known in the art. Wood particles not only provide livestock protection and comfort from the ground, but also absorb animal excrement. One drawback associated with prior art conversion of wood sources into livestock bedding is that as livestock production increases, typical sources of wood for the production of livestock bedding become increasingly scarce and expensive. It would therefore be desirable to provide a system for converting cheap and plentiful wood sources into livestock bedding.

While it is known in the art to convert waste wood, such as used pallets, into livestock bedding, such waste wood often contains nails or other metal objects that would be undesirable contaminants in livestock bedding. It would therefore be desirable to provide a system for producing livestock bedding without metal contaminants from waste wood such as used pallets. Another drawback is the inconsistent particle size of wood particles in prior art livestock bedding production systems. Such systems may produce wood particles that are too big, in which case they may be uncomfortable for the livestock to walk and lie upon. Such systems may also produce particles that are too small, such as is the case with sawdust, which is less desirable for animal bedding given its dustiness as well as its tendency to form clumps when wet, to retain liquid instead of allowing the moisture to drain freely, to be inadvertently moved from its desired location by air movement and/or being carried by livestock, and to be eaten by some types of livestock. It would therefore be desirable to provide a system to produce wood bedding of a consistent particle size.

SUMMARY OF THE DISCLOSED SUBJECT MATTER

Systems and methods of the present disclosure are directed to converting metal-containing waste wood material into livestock bedding with a reduced metal content. Waste wood, such as used or broken pallets are subsequently placed in hammermills having screens with holes of subsequently smaller diameters to produce livestock bedding of a consistent size. A crossbelt system of magnets is passed across the waste wood to remove nails and other metal contaminates from the waste wood.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

In general, systems and methods of this disclosure may enable the conversion of waste wood material into livestock bedding. More specifically, these systems and methods enable the conversion of metal-containing waste wood pallets into substantially metal-free livestock bedding.

Exemplary Systems

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and materials have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated steps, operations, elements, and/or components, but do not preclude the presence or addition of one or more other steps, operations, elements, components, and/or groups thereof.

Attention is now directed toward embodiments of the system and method for producing a more consistent livestock bedding from wood waste with fewer metal contaminants.

The use of wood shavings and other various wood products has long been typical in the livestock industry to absorb animal excrement and provide animal comfort. With the increase in livestock production the availability of commonly used bedding products is declining.

The system and method of this disclosure takes what would otherwise end up as landfill wood waste and processes it into a useable product suitable for the bedding of livestock. For years, broken pallets, board cut offs and other off fall wood products from various industries have been landfilled. This system and method allows for the transformation of that wood waste into a valuable product.

Waste and scrap wood are collected and brought to a central processing facility. There the product is first run through either an industry standard wood shredder or hammermill and then processed a second time through a hammermill. Magnets are used to remove metal, such as nails and the like from the resulting product, before the final product is then stored in a covered space, such as a barn, where it is protected from the elements of weather including wind and moisture. When the product is needed it may be used as livestock bedding either alone or in conjunction with other livestock bedding.

Figure 1:
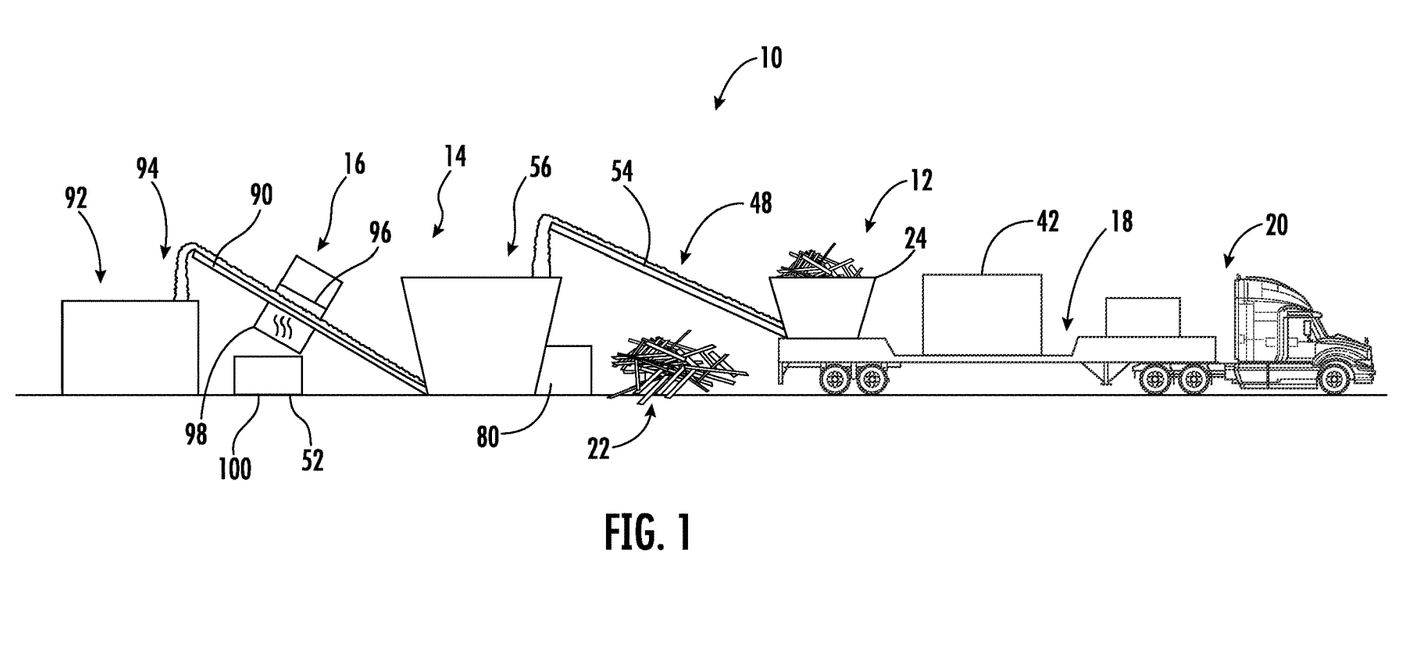
FIG. 1 illustrates a side elevation of the livestock bedding system of the present invention.
Figure 2:
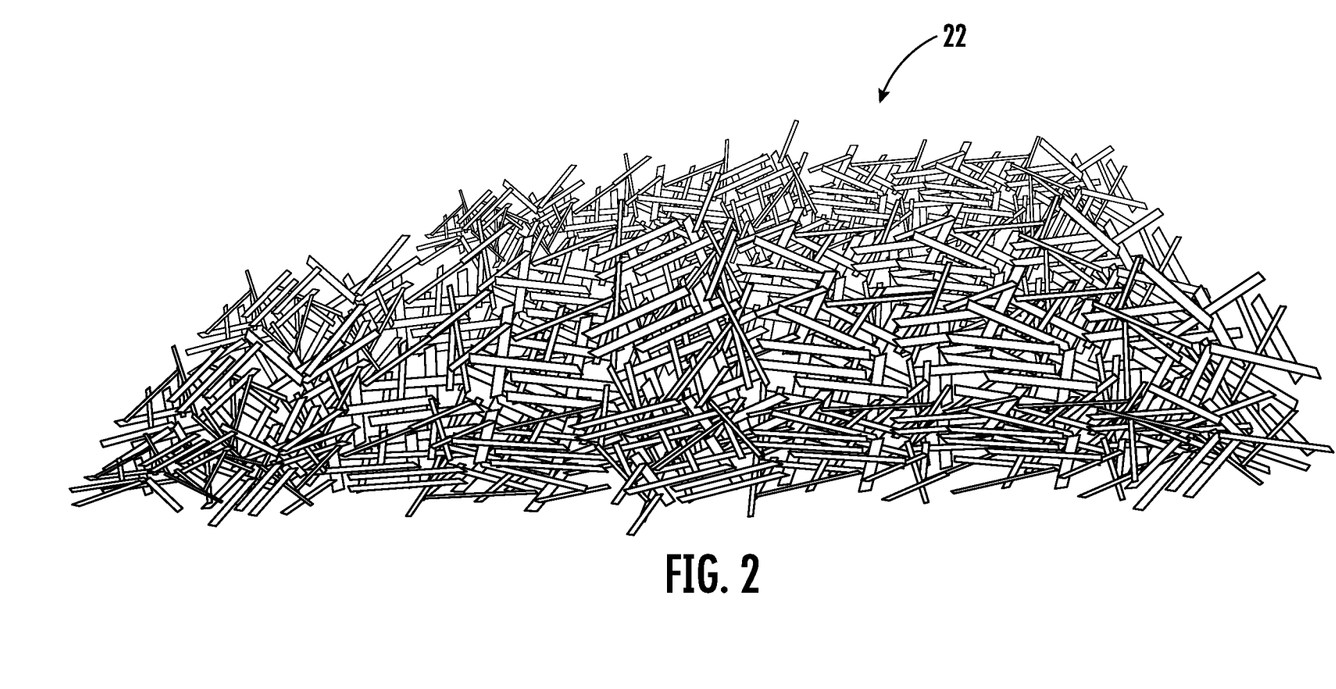
FIG. 2 illustrates a front perspective view of waste wood pallets before being converted into livestock bedding.

FIG. 1 illustrates the system (10) of the present invention having a first hammermill (12), a second hammermill (14), and a crossbelt magnetic separator assembly (16). While the first hammermill (12), second hammermill (14), and crossbelt magnetic separator assembly (16) may be of any type known in the art, in one embodiment the first hammermill (12) is a Hydrafork tub grinder and the second hammermill (14) is a Mighty Giant 3700 tub grinder, both manufactured by Jones Manufacturing Company of Beemer Nebraska, USA, while the crossbelt magnetic separator assembly (16) is an LGI Crossbelt Model #700 crossbelt magnetic separator manufactured by Longi Magnet Co, Ltd. Of China. As shown, the first hammermill (12) is provided on a "lowboy" trailer (18), pulled by a truck (20) to allow the first hammermill (12) to be easily transported to wherever a supply of waste wood (22) might be located. FIGS. 1-2.

Figure 3:
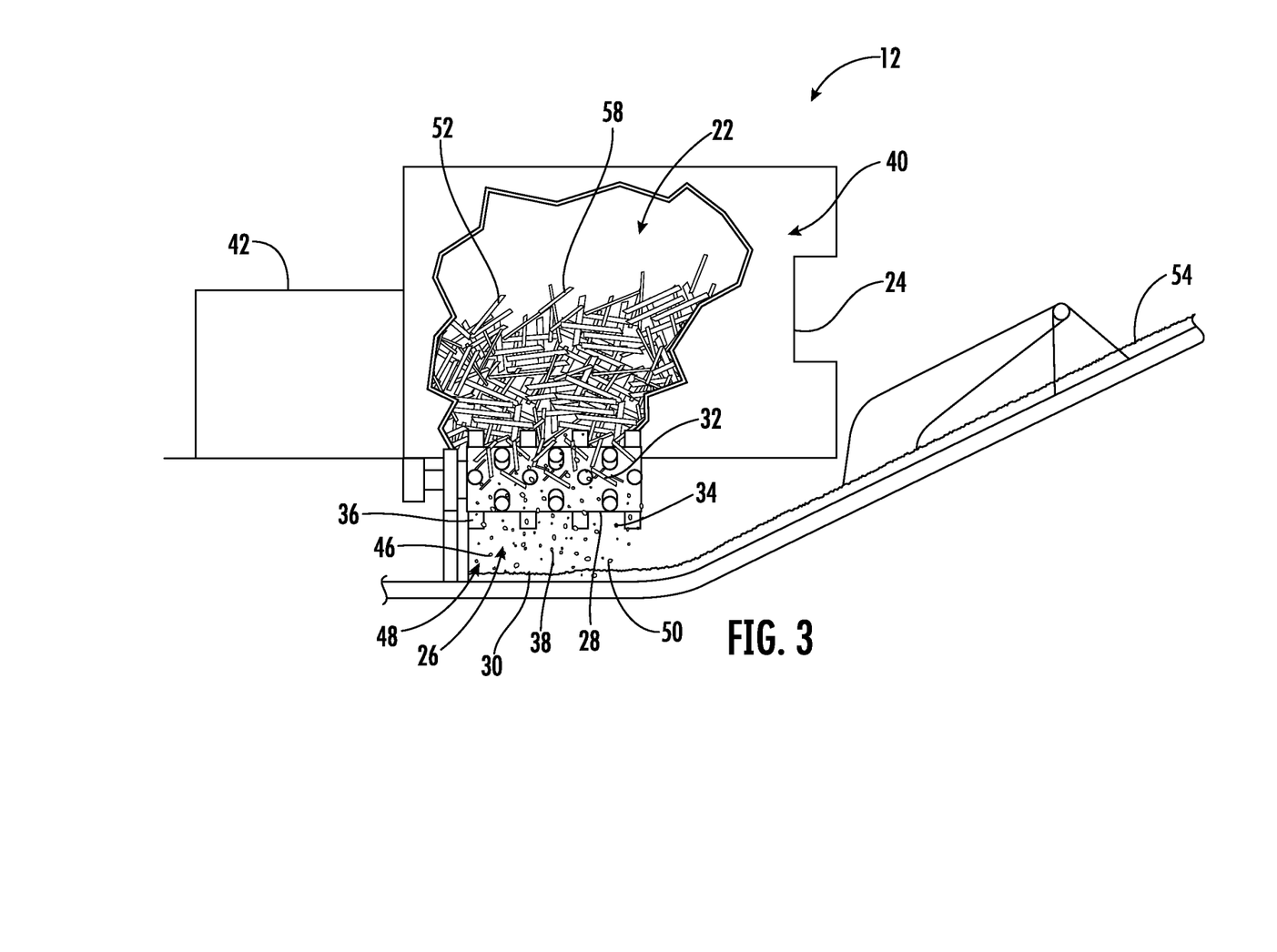
FIG. 3 illustrates a cutaway perspective view of waste wood being converted into large granular wood material by a first hammermill having a screen with large openings.

As shown in FIG. 3, the first hammermill (12) is provided with a first housing (24) a first plurality or "set" (26) of hammers (36), and a first screen (28). While the first hammermill (12) may be set up to convert waste wood (22) into unrefined large granular wood material (30) of any particle size, in a preferred embodiment, the first screen (28) defines a first plurality of openings (32) comprising at least fifty percent of the area defined by a perimeter (34) of the first screen (28). The openings (32) on the first screen (28) are round and equally-sized, having a diameter preferably between 1.5-4 inches, more preferably between 1.6-3 inches, and most preferably about 2 inches. Similarly, the hammers (36) are preferably 0.25-1 inch in width, and more preferably about 0.5 inches in width and located a distance from the first screen (28) preferably between 0.2-3 inches, more preferably between 0.2-2.2 inches, and most preferably about 0.25 inches to produce particles (38) of the large granular wood material (30) preferably no greater than 4.0 inches at their widest and no narrower than 1.0 inches at their narrowest, and more preferably no greater than 3.0 inches at their widest and no narrower than 1.5 inches at their narrowest.

As shown in FIGS. 1-3, the waste wood (22) is inserted through a mouth (40) of the first hammermill (12). The waste wood (22) is preferably broken or discarded wood pallets (58) that contain nails (52) or the like. As the waste wood (22) passes through the mouth (40) of the first hammermill (12) a motor (42) of the first hammermill (12) drives the first set (26) of hammers (36) at at least 2,000 revolutions per minute to break the waste wood (22) against the first screen (28) until the waste wood (22) has been broken onto pieces (46) small enough to pass through the first plurality of openings (32) in the first screen (28). Preferably the speed of the hammers (36) breaking up the waste wood (22) causes a sufficient amount of friction to increase the temperature of a majority of the pieces (46) to at least 125 degrees Fahrenheit, and more preferably at least 160 degrees Fahrenheit as they pass through the first screen (28). This heating action kills microorganisms and dries the wood to a desired water moisture content.

The material (48) passing through the first screen (28) comprises the large granular wood material (30) and waste metal contaminants (50) such as nails (52) and the like that may or may not have become dislodged from the large granular wood material (30) by the hammers (36) and first screen (28). From the first screen (28), the material (48) drops onto a conveyor belt (54) that extends from the lower portion of the first hammermill (12) to a position above a mouth (56) of the second hammermill (14). The conveyor belt (54) may be driven by the motor (42) or by any known means in the art. The conveyor belt (54) transfers the material (48) from the first hammermill (12) to the second hammermill (14) where the material (48) drops from the conveyor belt into the mouth (56) of the second hammermill (14).

Figure 4:
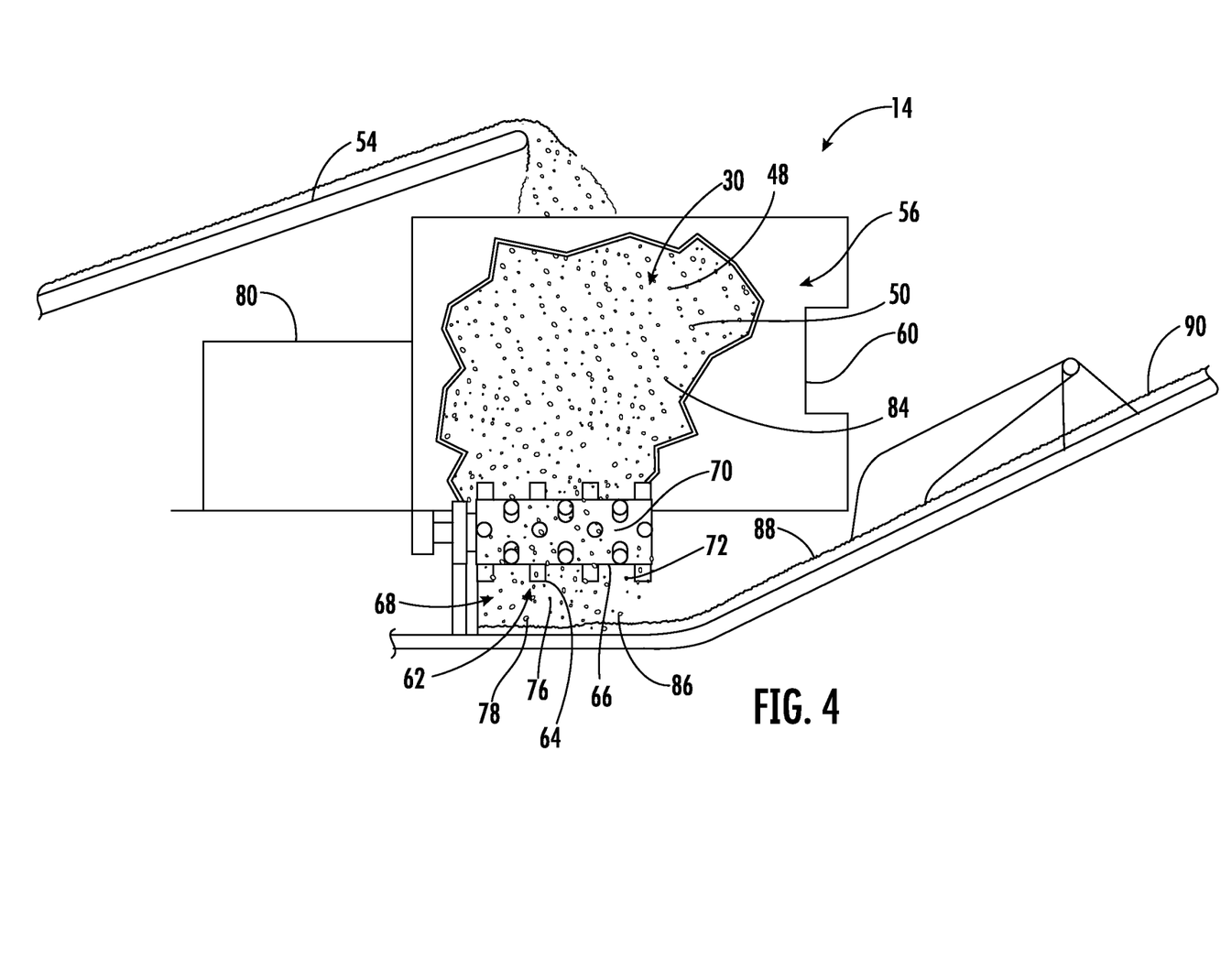
FIG. 4 illustrates a cutaway perspective view of large granular wood material being converted into small granular wood material by a second hammermill having a screen with small openings.

As shown in FIGS. 1 and 4, the second hammermill (14) is provided with a second housing (60) a second plurality or "set" (62) of hammers (64), and a second screen (66). Like the first hammermill (12), the second hammermill (14) may also be set up to convert the material (48) into unrefined small granular wood material (68) of any particle size, in a preferred embodiment, the second screen (66) defines a second plurality of openings (70) comprising at least fifty percent of the area defined by a perimeter (72) of the second screen (66). The openings (70) on the second screen (66) are round and equally-sized, having a diameter preferably between 0.2-1.875 inches, more preferably between 0.4-1.5 inches, and most preferably between 0.375-0.5 inches. Similarly, the hammers (64) are preferably 0.25-1 inch in width, and more preferably about 0.5 inches in width and located a distance from the second screen (66) preferably between 0.2-1.875 inches, more preferably between 0.4-1.5 inches, and most preferably between 0.375-0.5 inches to produce particles (76) of small granular wood material (78) preferably no greater than 1.875 inches at their widest and no narrower than 0.2 inches at their narrowest, and more preferably no greater than 1.5 inches at their widest and no narrower than 0.4 inches at their narrowest.

As the material (48) passes through the mouth (56) of the second hammermill (14), a motor (80) of the second hammermill (14) drives the second set (62) of hammers (64) at least 2,000 revolutions per minute to break the material (48) against the second screen (66), further decreasing the size of the wood particles (84) and dislodging the remaining metal contaminants (50) still secured to the large granular wood material (30). The second hammermill (14) continues to break up the large granular wood material (30) until the material (30) is small enough to pass through the second plurality of openings (72) in the second screen (66). Preferably the speed of the hammers (64) breaking up the wood particles (70) again causes a sufficient amount of friction to increase the temperature of the wood particles (70) to at least 125 degrees and more preferably at least 160 degrees Fahrenheit as they pass through the second screen (66) to kill microorganisms and to rekiln the wood particles (70) to a desired water moisture content.

The material (86) passing through the second screen (66) is unrefined, meaning it comprises both the small granular wood material (78) and waste metal contaminants (50). By this stage most, if not all, of the waste metal contaminants (50) have been dislodged from the small granular wood material (78) by the hammers (64) and second screen (66). Preferably at least 50% of the particles (88) of the small granular wood material (78) having at least one dimension at least 0.5 inches have no dimension greater than 1.875 inches and no dimension less than 0.2 inches. From the second screen (66), the material (86) drops onto a conveyor belt (90) that extends from the lower portion of the second hammermill (14) to a position above a container (92) that may be used for storage or transport of the final bedding product (94). The conveyor belt (90) may be driven by the motor (80) or by any known means in the art.

Figure 5:
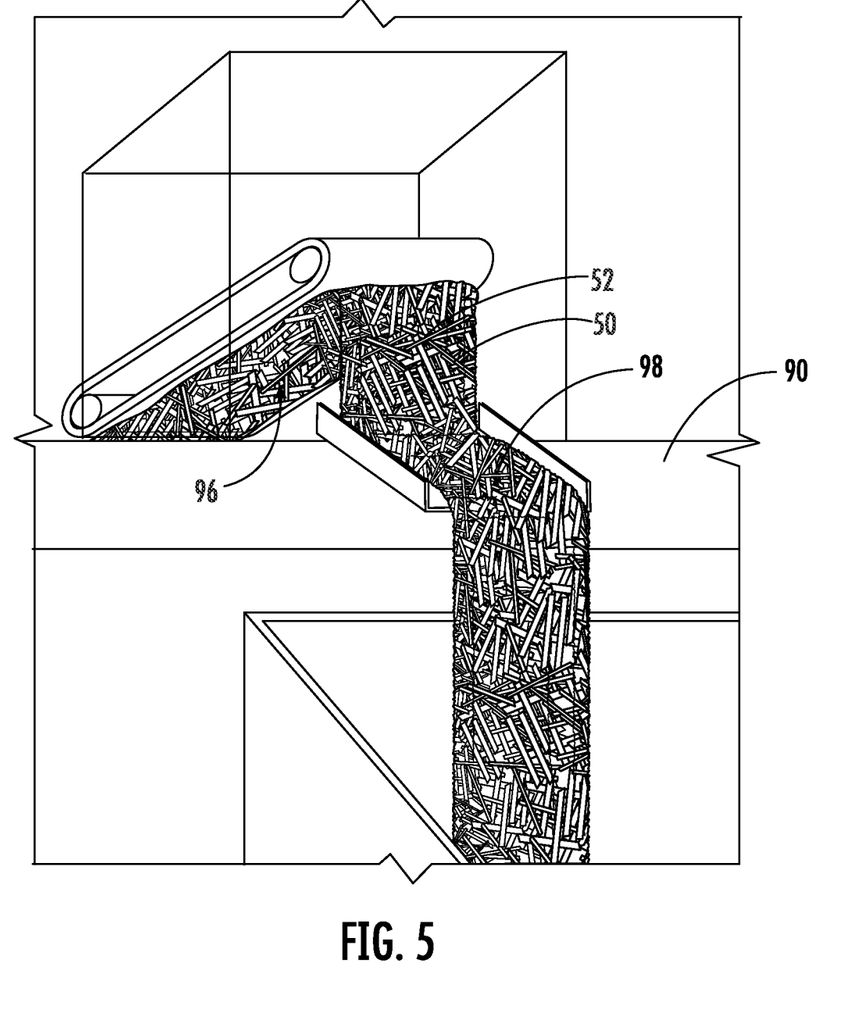
FIG. 5 illustrates a perspective view of a crossbelt magnetic separator removing metal particles from small granular wood material.

The As shown in FIGS. 4-5, positioned above the conveyor belt (90) is the crossbelt magnetic separator assembly (16) which has a crossbelt suspended belt magnet (96) for magnetic separation, such as those known in the art. The belt magnet (96) is suspended above the conveyor belt (90) a sufficient height and run at a sufficient speed such as that known in the art to refine the small granular wood material (78) into the final bedding product (94) by removing tramp metal (98), including remaining metal contaminants (50) such as nails (52) from the small granular wood material (78).

While most of the second hammermill (14) preferably dislodged substantially all of the remaining metal contaminants (50) from the final bedding product (94), in the event small pieces of small granular wood material (78) remain attached to some of the remaining metal contaminants (50), the belt magnet (96) will attract the remaining metal contaminants (50) still attached to small pieces of small granular wood material (78) and remove them both from the conveyor belt (90). The remaining metal contaminants (50), removed from conveyor belt (90) by the belt magnet (96) are conveyed to a deflector chute (98) where the remaining metal contaminants (50) are collected in a container (100) and recycled. The system (10) preferably removes at least 50% of the remaining metal contaminants (50), more preferably at least 90% of the remaining metal contaminants (50), and most preferably at least 98% of the remaining metal contaminants (50). While this process only removes ferrous metal contaminants, such contaminants constitute the majority of metal contaminants found in waste wood (22) such as pallets (58). If it is desired to remove other types of metal or contaminants, other separation systems known in the art may be used.

Figure 6:
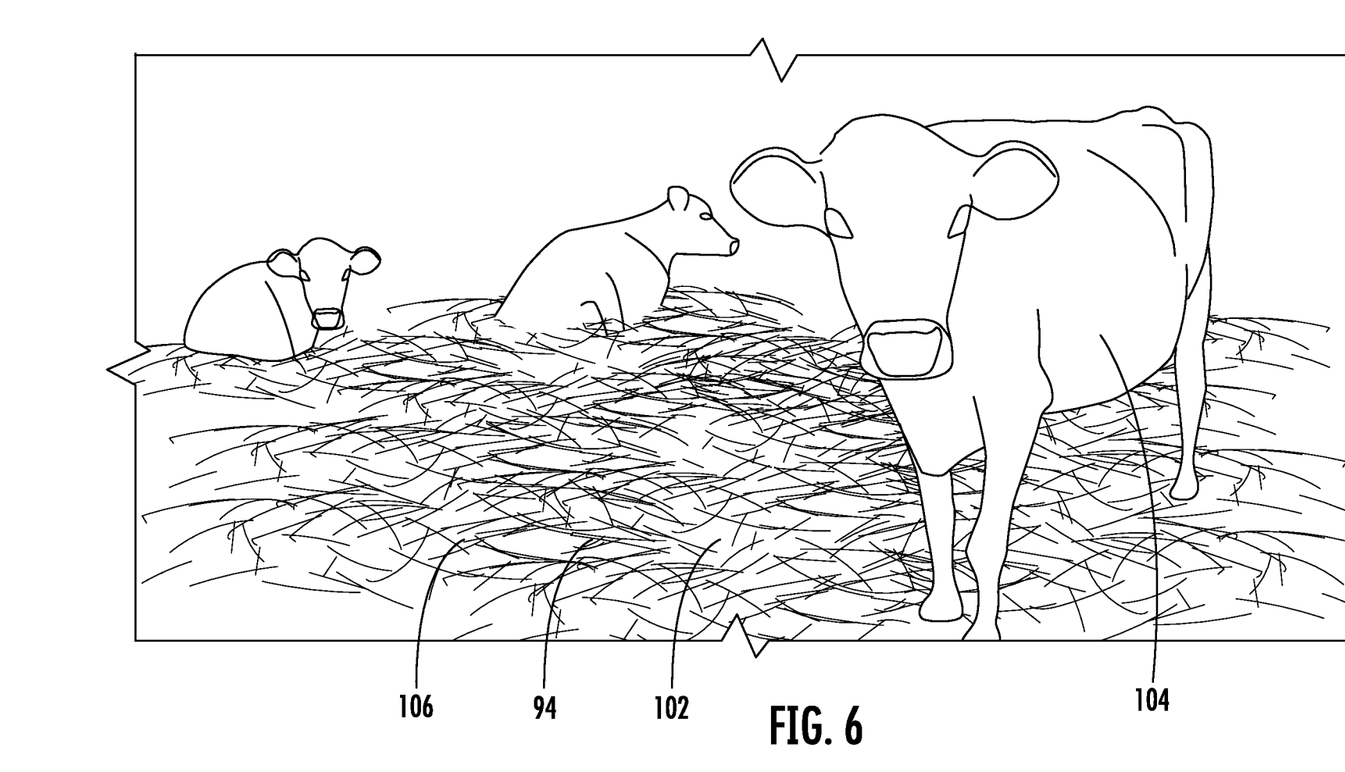
FIG. 6 illustrates a perspective view of livestock bedding created from waste wood pallets intermixed with prior art livestock bedding and placed on the floor of cattle house, for cattle to walk and rest upon.
Figure 7:
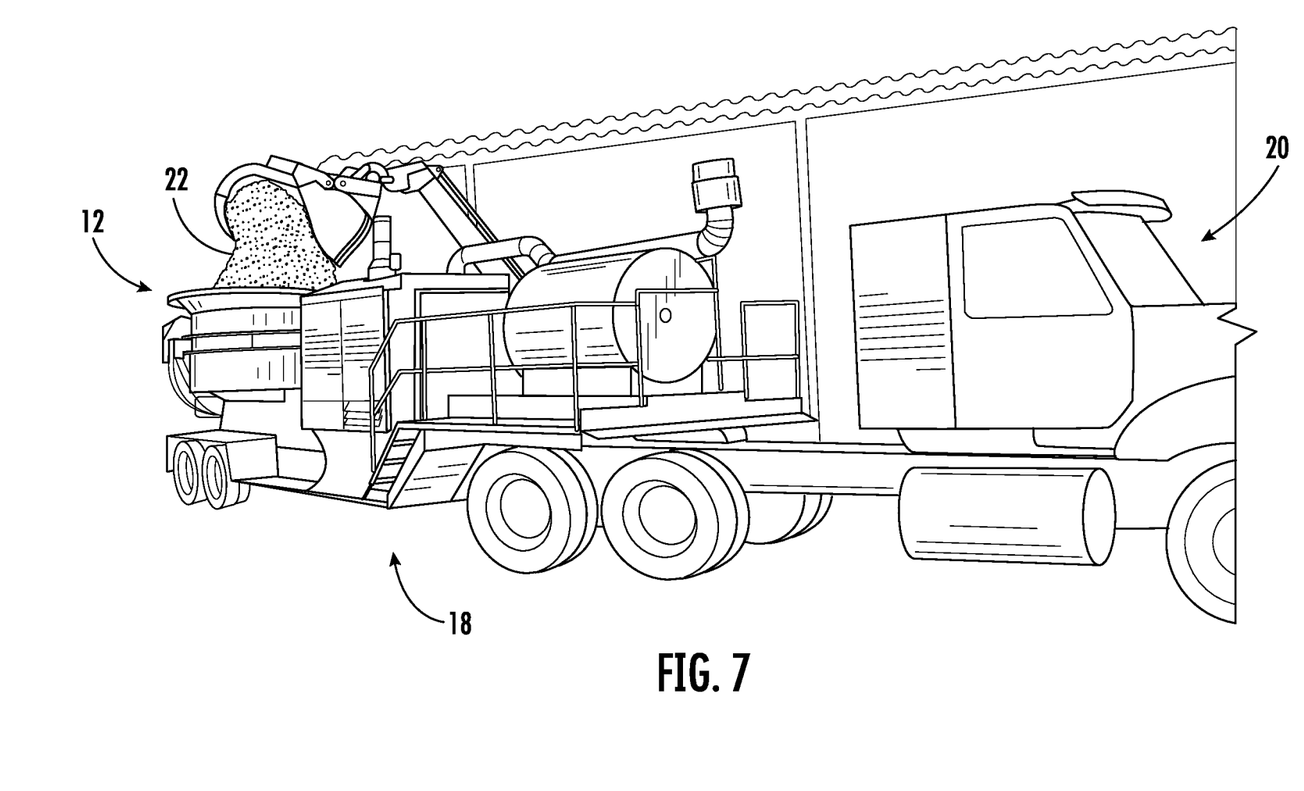
FIG. 7 illustrates a perspective view of the truck and trailer carrying the first hammermill.
Figure 8:
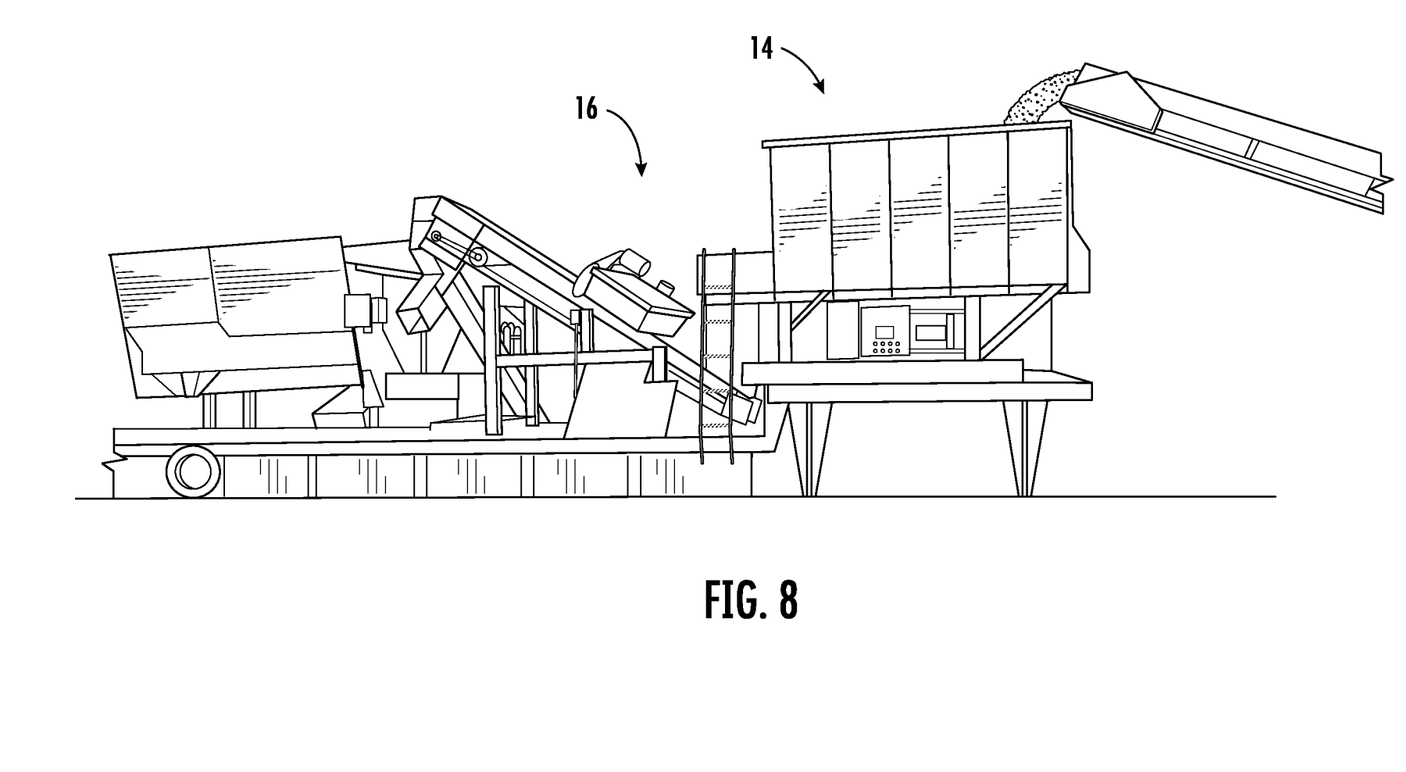
FIG. 8 illustrates a perspective view of the conveyor belt from the first hammermill positioned over the mouth of the second hammermill and the conveyor belt from the second hammermill positioned over the container collecting the final bedding product.
Figure 9:
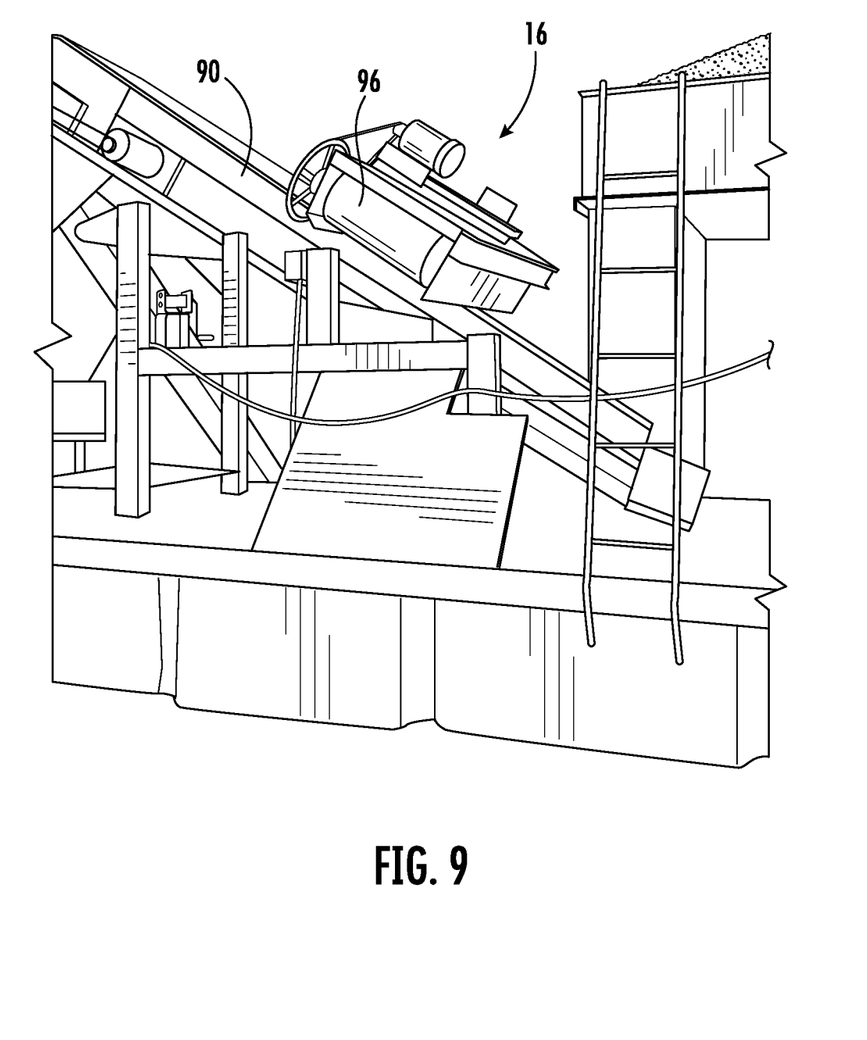
FIG. 9 illustrates a perspective view of crossbelt magnetic separator assembly.

After the belt magnet (96) has removed the remaining metal contaminants (50) still attached to small pieces of small granular wood material (78), the resulting material is the final bedding product (94). The conveyor belt (90) then transfers the final bedding product (94) to the container (92) whereafter the final bedding product (94) may be stored and transported for eventual use as bedding (102) for livestock (104) in a barn or other environment. FIGS. 1 and 5-6.

If desired, additional products may be added to and mixed with the final bedding product (94) before it is used as bedding for livestock (104). For example, a known odor suppressant may be added to reduce smell and/or a known antimicrobial material may be added to reduce microbial growth. In a similar manner, fungicides, pesticides, or any other material may be added to achieve desirable characteristics of the final bedding product (94). The final bedding product (94) may be used alone as bedding (102) for livestock (104), or may be combined with prior art bedding materials (106) in any desired combination to achieve a bedding (102) with the most desirable characteristics and cost for a particular application.

It is preferable that the waste wood be less than 20% water moisture content prior to processing with the system (10) to prevent clogging. During processing, the speed, screens, and hammer quantity, type, and spacing of the first hammermill (12) and second hammermill (14) may be adjusted to increase or decrease the heat added to the waste wood (22) to decrease the water moisture content of the final bedding product (94) by 50% or more as desired. Preferably the first hammermill (12) and second hammermill (14) of the system are operated to bring the water moisture content of the final bedding product (94) down to less than 9%, more preferably down to 7%, and most preferably down to 5%, depending on the ambient conditions and specifications associated with the final use.

In an alternative embodiment of the present invention, the belt magnet (96) may be positioned between the first hammermill (12) and the second hammermill (14) over the conveyor belt (54) to remove the remaining metal contaminants (50) from the waste wood (22) prior to the second hammermill (14). In another alternative embodiment of the present invention, an additional belt magnet (not shown) may be positioned between the first hammermill (12) and the second hammermill (14) over the conveyor belt (54) to remove the remaining metal contaminants (50) from the waste wood (22) prior to the second hammermill (14), with the belt magnet (96) removing any metal contaminants exiting the second hammermill (14) that the additional belt magnet may have missed. In yet another alternative embodiment the first hammermill (12) can be used as both the first and second hammermills. In this embodiment, a large amount of waste wood (22) is run through the first hammermill and the large granular wood material (30) existing the first hammermill (12) is collected and stored. The first hammermill (12) is then refitted with a screen and hammers as described above in association with the second hammermill (14). Thereafter, the large granular wood material (30) is run through the refitted first hammermill (12) and the small granular wood material (68) collected for use as bedding (102). In this embodiment, the metal contaminants may be removed before and/or after the large granular wood material (30) is run through the refitted first hammermill (12).

Although the invention has been described with respect to a preferred embodiment thereof, it is to be understood that it is not to be so limited since changes and modifications can be made therein which are within the full, intended scope of this invention as defined by the appended claims.

What is claimed is:

1. A method for producing granular wood material comprising:
   providing a first hammermill having a first housing, a first hammer, and a first screen;
   wherein the first screen defines a first plurality of openings having at least a first opening and wherein the first opening is no greater than 4.0 inches at its widest and no narrower than 1.5 inches at its narrowest;
   wherein during operation of the first hammermill the first hammer passes no closer than 0.2 inches and no farther than 4.0 inches from first screen;

inserting a quantity of metal-containing wood material into the first housing;

heating the quantity of metal-containing wood material to at least 160 degrees Fahrenheit after the quantity of metal-containing wood material enters the first hammermill and before the quantity of metal-containing wood material passes through the first screen;

operating the first hammermill at a speed of at least 2,000 revolutions per minute to pass the quantity of metal-containing wood material through the first screen to produce a quantity of large granular wood material having a plurality of particles no greater than 4.0 inches at their widest and no narrower than 1.5 inches at their narrowest;

providing a second hammermill having a second housing, a second hammer, and a second screen;

wherein the second screen defines a second plurality of openings having at least a second opening and wherein the second opening is no greater than 1.875 inches at its widest and no narrower than 0.2 inches at its narrowest;

wherein during operation of the second hammermill the second hammer passes no closer than 0.2 inches and no farther than 4.0 inches from the second screen;

heating the quantity of the large granular wood material to at least 160 degrees Fahrenheit after the quantity of the large granular wood material enters the second hammermill and before the quantity of the large granular wood material passes through the second screen;

inserting a quantity of the large granular wood material into the second housing;

operating the second hammermill at a speed of at least 2,000 revolutions per minute to pass the quantity of the large granular wood material through the second screen to produce a quantity of unrefined small granular wood material having a plurality of particles no greater than 1.875 inches at their widest and no narrower than 0.2 inches at their narrowest; and passing a magnet close enough to the quantity of unrefined small granular wood material to remove at least one piece of metal from the quantity of unrefined small granular wood material to produce a quantity of refined small granular wood material.

2. The method of claim 1, wherein at least 50% of the particles in the refined small granular wood material have a dimension at least 0.5 inches, have no dimension greater than 1.875 inches, and have no dimension less than 0.2 inches.

3. The method of claim 1, wherein at least 50% of the particles in the refined small granular wood material have a dimension at least 0.5 inches, have no dimension less than 0.375 inches, and have no dimension greater than 0.75 inches.

4. The method of claim 1, wherein the first opening is no greater than 3.0 inches at its widest and no narrower than 1.5 inches at its narrowest.

5. The method of claim 1, wherein the second opening is no greater than 0.5 inches at its widest and no narrower than 0.375 inches at its narrowest.

6. The method of claim 1 further comprising using at least a portion of the quantity of refined small granular wood material as animal bedding.

7. The method of claim 1 wherein the openings of the first plurality of openings are circular.

8. The method of claim 7 wherein the openings of the second plurality of openings are circular.

9. The method of claim 1 wherein the quantity of metal-containing wood material has a water moisture content less than 20%.

10. The method of claim 1 wherein operating the second hammermill to produce the quantity of unrefined small granular wood material comprises operating the second hammermill to heat the refined small granular wood material sufficiently to reduce the water moisture content of the unrefined small granular wood material to less than 9%.

11. The method of claim 1 wherein passing the magnet close enough to the quantity of unrefined small granular wood material comprises passing the magnet close enough to the quantity of unrefined small granular wood material to remove at least 50% by weight of the metal content of the unrefined small granular wood material.

12. The method of claim 1 wherein passing the magnet close enough to the quantity of unrefined small granular wood material comprises passing the magnet close enough to the quantity of unrefined small granular wood material to remove at least 98% by weight of the metal content of the unrefined small granular wood material.

13. The method of claim 1 further comprising adding an odor suppressant to the refined small granular wood material to provide the refined small granular wood material with odor suppressant characteristics.

14. The method of claim 1 further comprising adding an antimicrobial material to the refined small granular wood material to provide the refined small granular wood material with antimicrobial characteristics.

15. The method of claim 1, wherein passing the magnet close enough to the quantity of unrefined small granular wood material comprises passing a crossbelt system of magnets close enough to the quantity of unrefined small granular wood material to remove at least 50% by weight of the ferrous metal content of the unrefined small granular wood material.

16. A method for producing granular wood material comprising:

providing a first hammermill having a first housing, a first hammer, and a first screen;

wherein the first screen defines a first plurality of openings having at least a first opening and wherein the first opening is no greater than 4.0 inches at its widest and no narrower than 1.5 inches at its narrowest;

wherein during operation of the first hammermill the first hammer passes no closer than 1.5 inches and no farther than 4.0 inches from a first portion of the first screen defining the first opening;

inserting a quantity of metal-containing wood material into the first housing;

heating the quantity of metal-containing wood material to at least 160 degrees Fahrenheit after the quantity of metal-containing wood material enters the first hammermill and before the quantity of metal-containing wood material passes through the first screen;

operating the first hammermill at a speed of at least 2,000 revolutions per minute to pass the quantity of metal-containing wood material through the first screen to produce a quantity of unrefined large granular wood material having a plurality of particles no greater than 4.0 inches at their widest and no narrower than 1.5 inches at their narrowest;

passing a first magnet close enough to the quantity of unrefined large granular wood material to remove at least one piece of metal from the quantity of unrefined large granular wood material to produce a quantity of refined large granular wood material;

providing a second hammermill having a second housing, a second hammer, and a second screen;

wherein the second screen defines a second plurality of openings having at least a second opening and wherein the second opening is no greater than 1.875 inches at its widest and no narrower than 0.2 inches at its narrowest;

wherein during operation of the second hammermill the second hammer passes no closer than 0.2 inches and no farther than 4.0 inches from a second portion of the second screen defining the second opening;

(I) inserting a quantity of the refined large granular wood material into the second housing;

heating the quantity of the refined large granular wood material to at least 160 degrees Fahrenheit after the quantity of the refined large granular wood material enters the second hammermill and before the quantity of the refined large granular wood material passes through the second screen; and operating the second hammermill at a speed of at least 2,000 revolutions per minute to pass the quantity of the refined large granular wood material through the second screen to produce a quantity of small granular wood material having a plurality of particles no greater than 1.875 inches at their widest and no narrower than 0.2 inches at their narrowest.

17. The method of claim 16, wherein passing the magnet close enough to the quantity of unrefined large granular wood material comprises passing a crossbelt system of magnets close enough to the quantity of unrefined large granular wood material to remove at least one piece of metal.

18. A method for producing granular wood material for animal bedding comprising:

providing a first hammermill having a first housing, a first hammer, and a first screen;

wherein the first screen defines a first plurality of openings having at least a first opening and wherein the first opening is no greater than 4.0 inches at its widest and no narrower than 2.0 inches at its narrowest;

wherein during operation of the first hammermill the first hammer passes no closer than 0.2 inches and no farther than 4.0 inches from a first portion of the first screen defining the first opening;

inserting a quantity of wood into the first housing;

heating the quantity of wood to at least 160 degrees Fahrenheit after the quantity of wood enters the first hammermill and before the quantity of wood passes through the first screen;

operating the first hammermill at a speed of at least 2,000 revolutions per minute to pass the quantity of wood through the first screen to produce a quantity of large granular wood material having a plurality of particles no greater than 4.0 inches at their widest and no narrower than 2.0 inches at their narrowest;

providing a second hammermill having a second housing, a second hammer, and a second screen;

wherein the second screen defines a second plurality of openings having at least a second opening and wherein the second opening is no greater than 1.9 inches at its widest and no narrower than 0.2 inches at its narrowest;

wherein during operation of the second hammermill the second hammer passes no closer than 0.2 inches and no farther than 4.0 inches from a second portion of the second screen defining the second opening;

inserting the quantity of the large granular wood material into the second housing;

heating the quantity of the large granular wood material to at least 160 degrees Fahrenheit after the quantity of the large granular wood material enters the second hammermill and before the quantity of the large granular wood material passes through the second screen;

operating the second hammermill at a speed of at least 2,000 revolutions per minute to pass the quantity of large granular wood material through the second screen to produce a quantity of small granular wood material having a plurality of particles no greater than 1.9 inches at their widest and no narrower than 0.2 inches at their narrowest; and using the quantity of small granular wood material as animal bedding.

\* \* \* \* \*